April 16, 1963 W. HALLIDAY 3,086,195
FLAW-DETECTION AND LIKE SYSTEMS USING SONIC OR ULTRASONIC WAVES
Filed Oct. 15, 1956
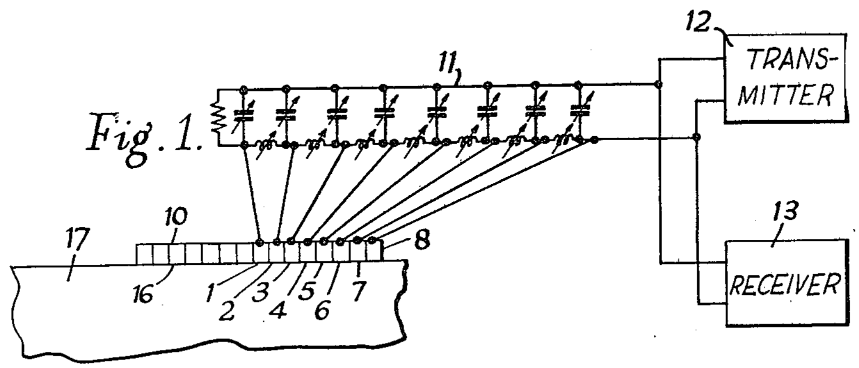
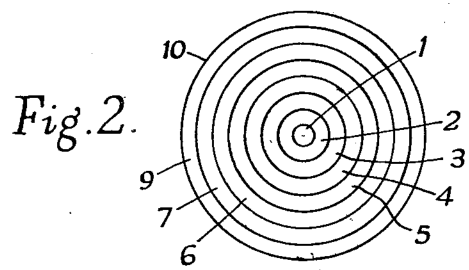
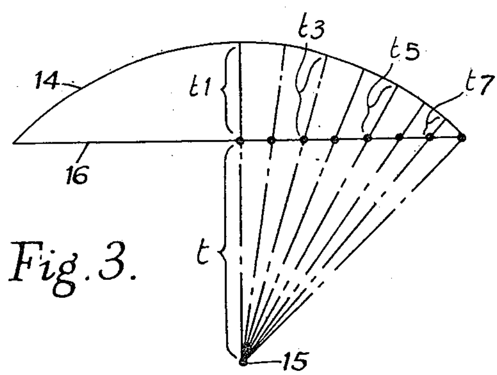
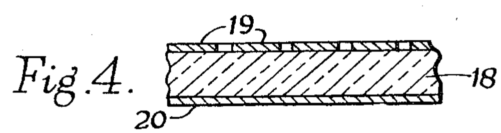
W. HALLIDAY
INVENTOR
BY Moore & Hall
ATTORNEYS United States Patent Office 3,086,195

Patented Apr. 16, 1963

3,086,195

FLAW-DETECTION AND LIKE SYSTEMS USING SONIC OR ULTRASONIC WAVES

William Halliday, Barkingside, England

Filed Oct. 15, 1956, Ser. No. 615,998
Claims priority, application Great Britain Oct. 13, 1955
10 Claims. (Cl. 340—15)

The present invention relates to flaw-detection and like systems using sonic or ultrasonic waves.

The relatively large cross-sectional area of the sonic or ultrasonic beam in known flaw-detecting systems using plane transducers makes it difficult to determine with precision the location of a flaw. The beam angle can be made small by using transducers whose dimensions are several wavelengths, but the cross-sectional area of the beam even at short range where it is smallest, and where in fact, testing is usually required, can never be less than the area of the transducer.

The area of the beam can be reduced by increasing the frequency of the waves and by using a smaller-dimensioned transducer but a practical upper limit to this frequency is set by scatter from inhomogeneities in the material tested and by the difficulties in ensuring an efficient coupling between the searching probes and the surface of the material. In practice this area is usually of the order of 2 or 3 sq. cms. which is considerably larger than would be desirable.

The present invention has for its object to provide means whereby the aforesaid disadvantages can be substantially reduced.

According to the present invention a flaw-detection or like system comprises a transducer actually or effectively divided into a plurality of parts all in one plane and means for applying oscillatory electrical energy to or taking oscillatory electrical energy from the said parts with progressively different time delays.

When uniform focusing in both dimensions of the beam cross-section is required the transducer may be in the form of a plurality of concentric rings. For focusing in one plane only it may take the form of a plurality of parallel strips.

The transducer according to the invention may be a transmitting or a receiving transducer in which case the other transducer, that is the receiving or transmitting transducer respectively, may also be constructed in accordance with the invention or it may be of the usual form, that is to say in one piece. Alternatively the transducer divided into parts may serve as both the transmitter and the receiver.

The widths of the said parts and the distances between their centres should preferably be less than half the wavelength of the oscillations employed in the specimen under test.

Means may be provided for varying the time delays in order that the depth at which the beam is focused may be varied.

The amplitude of the oscillations applied to the parts may be "tapered" (using radio aerial and transducer terminology), i.e. it may be made progressively different in such a manner that the energy is more concentrated at the centre of the diffraction pattern at the focus. This may be achieved by the association of suitably different resistances with the sections of the delay network, or by suitably tapering the impedances of the separate sections of the network.

The invention will be described by way of example, with reference to the accompanying drawing in which FIG. 1 is a digrammatic representation of one embodiment of the invention, FIG. 2 is a plan view of the transducer in FIG. 1, FIG. 3 is a diagram showing how the time delays may be determined in the embodiment of FIG. 1 and FIG. 4 is an enlarged sectional view of part of another form of transducer that may be used in carrying out the invention.

In the example of FIGS. 1 and 2 a common transducer 10 is used for transmitting and receiving. The transducer is made up of a plurality, say six or more, of concentric rings 1, 2, 3 etc., the thickness of the composite plate so constituted being that corresponding to resonance at the working frequency.

A delay network 11 is connected to a transmitter 12 and receiver 13 and the individual rings of the transducer, which may for example be of quartz or barium titanate, are connected to different tappings on the delay network, the centre ring or disc 1 being connected to the end of the network further from the transmitter and receiver. the outer ring 8 being connected to the end of the network nearer the transmitter and receiver. By connecting the intermediate rings to suitable different intermediate points in the network, the transducer can be made to behave almost as if the transducer parts were all disposed on the surface of a sphere and were energised simultaneously, the beam being focused almost at the centre of the sphere. Thus as shown in FIG. 3 if the transducer parts lay on the spherical surface 14, no difference in time delay would be required in order to focus the beam at the centre 15 of the sphere. If, as in FIGS. 1 and 2, the transducer has a plane surface 16 to be placed in contact with a surface of a body 17 under test, the time delays required in the connections between the individual parts of the transducer in order that the beam may be focused at a depth corresponding to a time $t$ below the surface of a body are represented by $t_1$ to $t_7$ for the parts 1 to 7 respectively, no time delay being required for the part 8. The requirements of the delay line are that the ratio of the difference in time delay between the coupling elements to the electrodes of each adjacent pair such as 1, 2; 2, 3 to the distance between the centres of these electrodes, proceeding away from the central electrode 1, increases. The effect is that the wave energy is propagated in a convergent beam. This requirement can readily be illustrated by referring to FIG. 3. If the distance between successive dots on the line 16, which dots represent the locations of successive electrodes on the transducer, is represented by $d$, it then follows that $(t_1-t_2)/d$ is less than $(t_2-t_3)/d$, which is less than $(t_3-t_4)/d$ and so on, the maximum value of this ratio being $t_7/d$.

It will be evident that the various time delays may be made variable either by making individual filter elements variable in the delay network 11 or by connecting a variable time delay device in all but one of the connections between the delay network and the transducer 10. By suitably varying the time delays the "radius" of the equivalent sphere can be varied and so in the example described the depth at which the beam is focused can be varied.

Concentration of the energy at a focus has the further advantage that scattering caused by porosity at points away from the focus will cause a smaller interfering or spurious signal than is produced with beams in the usual way.

In the embodiment described, the transducers are composed of individual rings of, say, quartz or barium titanate. As an alternative, a block of the transducer material may be used, the block being divided electrically into separate rings by means of rings of electrically conducting material upon it. A block so divided acts in much the same way as separate rings of the material.

This is illustrated in FIG. 4 where a block 18 of quartz or barium titanate is provided with rings 19 of metal plating. These rings may be applied through a suitable mask by electro-plating, spraying or otherwise. The other electrode of the transducer is indicated at 20. In this form of transducer, as in that previously described, the parts may be in the form of parallel strips instead of rings.

Although the invention has been described as applied to flaw-detection it is also applicable to other purposes, such for example as in echo-sounding.

I claim:

1. A wave propagation system for propagating through a medium pulses of wave energy generated by an electrical oscillation generating device to an electrical detecting device, said system comprising at least one electromechanical transducer, a terminal for connection to at least one of said devices and coupling means between said transducer and said terminal, said transducer comprising a unitary piezo electric body having on one surface thereof at least three mutually insulated electrodes, one of said electrodes being centrally disposed on said surface with respect to the remaining electrodes, said coupling means comprising a coupling element between each said electrode and said terminal, said coupling elements providing respectively different time delays for said wave energy from said terminal to the respective electrodes with the greatest time delay being provided for said one electrode and decreasing amounts of delay for the remaining electrodes in accordance with their distance from said one electrode, the ratio of the difference in time delays provided by said coupling elements for each adjacent pair of said elements to the distance between said pair increasing for successive pairs increasingly remote from said one electrode, whereby said wave energy is propagated in a convergent beam.

2. A system according to claim 1, wherein the widths of the said electrodes and the distances between their centres are less than half the wavelength of the oscillatory energy.

3. A system according to claim 1, wherein said coupling elements are of progressively differing time delays, proceeding along said electrodes.

4. A system according to claim 1, wherein said time delays in said coupling elements connected to said electrodes differ progressively from electrode to electrode along said piezo electric body to focus oscillatory energy from said transducer substantially in one line.

5. The method of varying the focal point of a propagative wave transducer having a plurality of concentric elements which comprises varying the timing between electrical signals appearing on successive concentric elements of said transducer in accordance with a predetermined function.

6. The method of varying the focal point of a propagative wave transducer having a plurality of concentric elements, which comprises varying the timing between a signal supplied from a source of energy and successive concentric elements.

7. The method of varying the focal point of a compressional wave transducer having a plurality of concentric electrodes which comprises varying the relative phase angle between electrical signals appearing on successive annular portions of said transducer in accordance with a predetermined function.

8. A variable focus transmitting or receiving transducer for compressional wave apparatus comprising: a disc, formed of a material having piezoelectric properties, having a first electrode formed on one surface and a plurality of concentric electrodes formed on the other surface; means connecting said first electrode to a first terminal; and phase controlling means connecting each of said concentric electrodes to a second terminal, said first and second terminals comprising input and output terminals for said transducer.

9. In combination, apparatus for compressional wave exploration, comprising: transducer means having a first electrode positioned on one surface thereof and a plurality of concentric electrodes on the other surface thereof; means connecting said first electrode to a terminal; means connecting the first of said plurality of electrodes to a second terminal; a plurality of variable time delay means; and means connecting a time delay means intermediate said second terminal and one of each of said concentric electrodes.

10. Control apparatus for a bilateral compressional wave transducer comprising; bilateral transducer means having a plurality of concentric electrodes; means coupled to said transducer for causing voltages to appear on said electrodes; means connected to said electrodes for controlling the relative time relationship between voltages appearing on successive concentric electrodes so as to provide a variable focusing effect.

References Cited in the file of this patent

UNITED STATES PATENTS

| | | |
|---|---|---|
| 1,971,688 | Lange | Aug. 28, 1934 |
| 2,262,966 | Rohde | Nov. 18, 1941 |
| 2,521,642 | Massa | Sept. 5, 1950 |
| 2,748,369 | Smyth | May 29, 1956 |
| 2,786,193 | Rich | Mar. 19, 1957 |
| 2,806,155 | Rotkin | Sept. 10, 1957 |
| 2,827,620 | Batchelder | Mar. 18, 1958 |